(Model.)
C. A. PETTET.
Knob Attachment.
No. 233,693.  Patented Oct. 26, 1880.
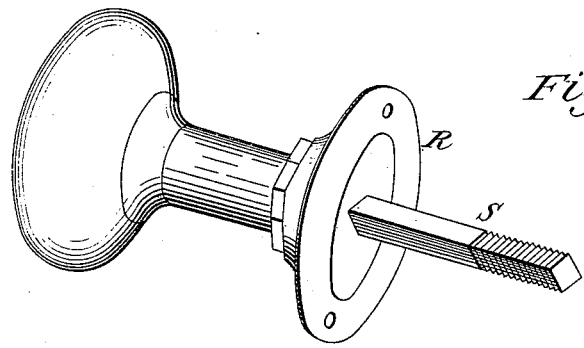
Fig. 1.
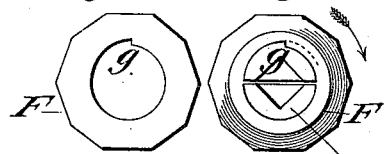
Fig. 5. Fig. 4.
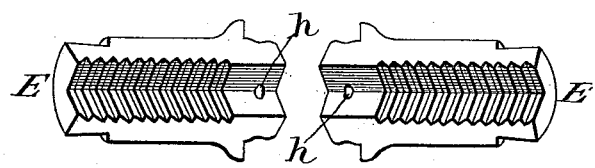
Fig. 2ˣ  Fig. 2ᶻ
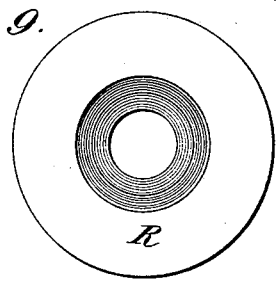
Fig. 9.
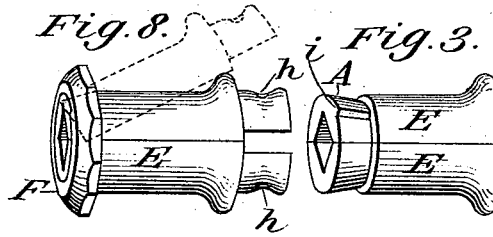
Fig. 8.  Fig. 3.
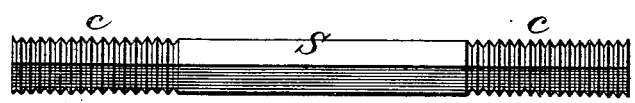
Fig. 7.
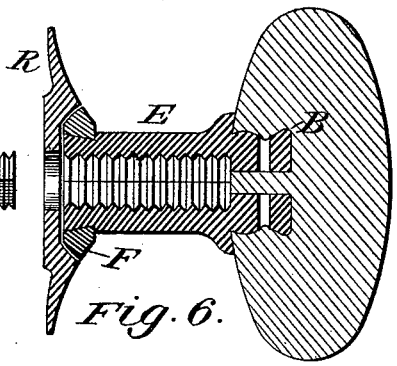
Fig. 6.
Witnesses:
Joseph Fox
W. T. Millett
Inventor:
Charles Arnold Pettet

UNITED STATES PATENT OFFICE.

CHARLES A. PETTET, OF BELLEVILLE, ONTARIO, CANADA.

KNOB ATTACHMENT.

SPECIFICATION forming part of Letters Patent No. 233,693, dated October 26, 1880.

Application filed July 31, 1880. (Model.)

*To all whom it may concern:*

Be it known that I, CHARLES A. PETTET, of the city of Belleville, in the Province of Ontario, Dominion of Canada, machinist, have invented new and useful Improvements in Door-Lock Knobs or Handles, of which the following is a specification.

My invention relates to improvements in the method of fastening the shank of a door-knob to its spindle so that, without the aid of screws or spring-catches, it will not become detached from its spindle, as those frequently do that are otherwise secured. The lengthening or shortening of the spindle to suit the thickness of the door is provided for in the usual way.

I attain these objects by the mechanism illustrated in the accompanying drawings, in which—

Figure 1 is a perspective view of the door-knob, shank, and spindle put together. Fig. 2 x and Fig. 2 z are longitudinal sections of the shank of the corrugated socket E. Fig. 3 shows the two sections of the shank laid together as they appear when cemented into the door-lock knob. Fig. 4 represents an end view of the shank and its eccentric g with the nut F, Fig. 5, placed over the ends of the two sections, binding them together. Fig. 6 shows a sectional view of the knob, shank, nut, and rose or washer combined as they appear when put together. Fig. 7 represents the lock-spindle, showing its corrugated ends c c. Fig. 8 represents the method of entering both sections of the shank into the nut. Fig. 9 is a rose or washer having a boss-shaped face and countersunk socket.

Similar letters refer to similar parts throughout the several views.

The eccentric end A of the shank, Fig. 3, is made of a dovetail shape in order to form a shoulder, over which the nut F, Fig. 5, is placed. The object of this form or dovetail is to keep the nut from coming off after it has been placed in position.

The manner in which I place the nut over the shank is performed in the following way: I first take that section of the shank E, Fig. 8, upon which the eccentric commences and place it in the nut F, and then I take the other section and insert its end obliquely into the nut, as shown by the dotted lines. In this way the upper half-section is easily inserted into the nut, and will close on its mate. This done, the shank is ready to be attached to the knob, which is done, in the usual way, with melted lead or cement.

For the purpose of better securing the shank to the knob there are projections formed on the end of the shank, (shown at B, Fig. 3,) which are intended to rest against the inside of the socket of the knob to prevent the two sections of the shank from spreading should it be necessary to tighten the shank in the socket of the knob by expanding the lead. This projection also forms a dovetail to prevent the shank from drawing out.

The small holes shown at h, Fig. 2, are to allow the cement to run into them to secure the shank still more firmly to the knob.

To secure the two sections of the shank firmly to the lock-spindle I place the spindle in the socket of the shank and turn the nut (see Fig. 4) firmly to the right, as indicated by the arrow, which closes the two sections of the shank firmly to the lock-spindle. This done, I pass the spindle through the lock in the door, and having previously adjusted the spindle in the shank to the length required, according to the thickness of the door, I repeat the operation, as above described, and secure the spindle to the opposite door-knob. Both door-knobs are thus securely attached to the spindle without the use of screws or spring-catches.

To loosen the handles or knobs from the spindle it is simply done by turning the nut F the reverse way, which can be done with an adjustable wrench.

I am aware that previous to my invention contrivances for fastening spindles to door handles or knobs have been made. I therefore do not claim such contrivance too broadly; but What I do claim as my invention, and desire to secure by Letters Patent, is—

1. In combination with a door-lock knob or handle, a shank, E, formed in two longitudinal pieces having a corrugated socket and a dovetail and eccentric-formed outer end, i, to allow a nut, F, having an eccentric bore, to clasp the ends of the sections of the shank together, substantially as shown, and for the purpose described.

2. In combination with the knob or handle of a door-lock, the eccentric-bored nut F, the corrugated spindle S, and the washer or rose R, having a boss-shaped face and countersunk socket to receive the nut, adapted to and in combination with the shank E, all substantially as described.

Belleville, Ontario, Canada, 25th May, 1880.

CHAS. A. PETTET.

Witnesses:
JOHN J. B. FLINT,
   *Of Belleville, Barrister.*
J. H. ENO,
   *Of Belleville.*